(12) United States Patent
Kurmlavage

(10) Patent No.: US 11,393,365 B2
(45) Date of Patent: Jul. 19, 2022

(54) ROLLER GRILL SEPARATING DEVICE ADVERTISEMENT DISPLAY

(71) Applicant: Spirit Specialty Solutions, Inc., Broomall, PA (US)

(72) Inventor: Michael M Kurmlavage, Monroeville, NJ (US)

( * ) Notice: Subject to any disclaimer, the term of this patent is extended or adjusted under 35 U.S.C. 154(b) by 548 days.

(21) Appl. No.: 16/546,688

(22) Filed: Aug. 21, 2019

(65) Prior Publication Data

US 2021/0056876 A1 Feb. 25, 2021

(51) Int. Cl.
*G09F 23/02* (2006.01)
*G09F 3/20* (2006.01)
*A47J 37/06* (2006.01)
*G09F 11/02* (2006.01)

(52) U.S. Cl.
CPC .............. *G09F 23/02* (2013.01); *A47J 37/06* (2013.01); *G09F 3/20* (2013.01); *G09F 11/02* (2013.01)

(58) Field of Classification Search
CPC ........ G09F 23/02; G09F 3/20; G09F 23/0058; G09F 23/06; A47J 37/06; A47J 37/048
See application file for complete search history.

(56) References Cited

U.S. PATENT DOCUMENTS

| | | | |
|---|---|---|---|
| 3,673,948 A * | 7/1972 | Albright | A47J 37/06 99/393 |
| 4,688,341 A * | 8/1987 | Castel | G09F 3/20 40/486 |
| 4,775,058 A * | 10/1988 | Yatsko | A47F 5/005 211/184 |
| 6,393,971 B1 | 5/2002 | Hunot | |
| 8,701,323 B2 | 4/2014 | Fenton | |
| D706,873 S * | 6/2014 | Kurmlavage | D20/43 |
| 8,844,431 B2 * | 9/2014 | Davis | A47J 37/0676 99/441 |
| 8,904,684 B1 * | 12/2014 | Kurmlavage | G09F 7/22 40/501 |
| 2005/0051037 A1 * | 3/2005 | Gaskill | A47J 37/048 99/421 R |
| 2010/0000135 A1 * | 1/2010 | Fenton | G09F 3/0295 40/501 |

(Continued)

*Primary Examiner* — Gary C Hoge
(74) *Attorney, Agent, or Firm* — Argus Intellectual Enterprise, LLC; Daniel Enea; Jordan Sworen

(57) ABSTRACT

Provided is an advertisement display system for a roller grill assembly and a food separating device. The display system includes a first advertisement display that covers the roller grill assembly control panel. The display utilizes an advertising panel and a pair of J-shaped clips extending from the top of the panel, such that the clips attach to the food separating device crossover bars to hold the advertising panel in position. The system also includes a second advertisement display comprising a removable advertising panel, an advertising panel support bracket, and a pair of bracket clips. The bracket clips attach to the food separating device separator bars to support the second advertisement display above the food separating device. The advertisement display system provides a convenient solution for providing information to consumers related to the items contained on the roller grill while preventing the controls from being inadvertently accessed.

10 Claims, 6 Drawing Sheets

(56) References Cited

U.S. PATENT DOCUMENTS

| | | | |
|---|---|---|---|
| 2011/0056387 A1* | 3/2011 | Kurmlavage | A47J 37/048 99/352 |
| 2012/0186460 A1* | 7/2012 | Humphrey | A47J 37/048 99/441 |
| 2016/0097516 A1* | 4/2016 | Howard | A47F 3/001 362/98 |
| 2019/0307290 A1* | 10/2019 | Kurmlavage | A47J 37/048 |
| 2021/0330097 A1* | 10/2021 | Kurmlavage | F24F 8/108 |
| 2022/0110488 A1* | 4/2022 | Hamann | A47B 57/406 |

* cited by examiner

ROLLER GRILL SEPARATING DEVICE ADVERTISEMENT DISPLAY

BACKGROUND OF THE INVENTION

1. Field of the Invention

The present invention relates to an advertisement display. More particularly, it pertains to an advertisement display system for a roller grill assembly.

A popular way to display food items at convenience stores and concession stands is to allow the product to both cook and remain warm on roller grill devices. Such roller grills heat the food items and are typical for use with hot dogs, sausages, and other retail food items which lend themselves to processing on roller grills given their shapes. Food items are typically placed on the heated rollers, which are comprised of roller elements which rotate continuously and cause the food item to roll while absorbing heat from the roller surfaces. In view of regulations and cleanliness required in such retail food environments, such roller grills are made of nonstick materials, chromed, or made of other high quality materials specifically suited to both convey heat efficiently, to remain clean, and to be easily maintained in the required sanitary condition.

In a roller grill that can cook many food products at one time, it is not always the case that one type of product is placed on the grill and removed from the grill all at once. Rather, the number of the products on the grill gradually decreases based on sales, and a grill operator accordingly keeps adding uncooked food to the grill. Therefore, cooked products and uncooked products are on the grill at the same time, and it is possible that uncooked products might contaminate cooked products. This problem has been overcome with the use of a grill separating device, which can be used to separate cooked and uncooked food, or to separate food by type.

As can be appreciated, consumers may find it difficult to identify which food item is cooked and which food item is uncooked, and which item is one type of product and which item is another. To overcome this problem, many establishments today label the available food items by using menu options mounted on the wall or the counter in which the retail food items are being offered. It is not always obvious, however, which labeling and pricing information relates to which item that is actually on the roller grill at any given time as available menu items may change throughout the day.

For requirements of cleanliness and isolation of food items from the general public as may be required by health regulations, such roller grills are encased in glass cases to shield the product to prevent contamination of the food and to prevent customers from accidentally being burned by direct access to the grill. It would be desirable to have information about the food item on the roller grill immediately available and in the same location as the items being offered so there is no confusion as to the name of the item, the composition of the item, or other information that consumers would need to know in order to make a selection. It is not always possible or practical to actually label the food item itself. Therefore, having a sign that can be placed near the food item on the grill would provide clear and more precise information, and is more desirable than the methods used today to label food items on the grill.

As can be seen by the foregoing, the main problem inherent in current methods for advertising food products on a roller grill is the need to have information related to the food item immediately available and in the same location as the items being offered so there is no confusion as to the name of the item, the composition of the item, or other information that consumers would need to know in order to make a selection. It is clear from the above description that a need exists for a roller grill advertising device that prevents these problems from occurring.

2. Description of the Prior Art

Devices have been disclosed in the prior art that relate to advertisement signs for roller grills. These include devices that have been patented and published in patent application publications. These devices generally relate to advertisement signs that attach to a roller grill for displaying product information. The following is a list of devices deemed most relevant to the present disclosure, which are herein described for the purposes of highlighting and differentiating the unique aspects of the present invention, and further highlighting the drawbacks existing in the prior art.

U.S. Pat. No. 6,393,971 B1 to Hunot discloses a means for detachably mounting a cover to the control panel of a roller grill assembly housing. The cover attaches at the lower end of the outer edges via a pair of integral tabs which have holes therethrough for receiving corresponding mounting pins. The cover can contain various advertising indicia.

U.S. Pat. No. 8,701,323 B2 to Fenton discloses a rolling information display apparatus for use with a roller grill. The device includes an elongated envelope with an advertising bearing medium removably positioned inside the envelope. A cylindrical rolling member includes one or more recessed surfaces bearing information about food items offered for sale on the grill.

As can be seen, these prior art devices attach directly to the control panel of the roller grill assembly, or are placed on top of the roller grill surface. The '971 device mounts directly to the roller grill control panel via a hole and pin system. As can be appreciated, this device does not provide an advertisement system that works with a variety of roller grill assemblies, as the device requires direct alignment of the holes and pins with the control panel. The '323 device requires that the cylinder containing the advertising indicia be smaller than the diameter of the rolling member, meaning that the size of the advertisement is limited and therefore difficult to see from a distance. As is evident from the foregoing, a need exists in the art for an advertisement system that can be readily viewed by a consumer from a distance and that works in conjunction with a roller grill food separating device. In this regard, the present invention substantially fulfills this need.

SUMMARY OF THE INVENTION

The present invention overcomes the problems inherent with known roller grill assembly advertisement systems by providing a new and improved advertisement display system that works in conjunction with a roller grill assembly and a food separating device. The device includes a first advertisement display that covers the roller grill assembly control panel. The display utilizes an advertising panel and a pair of J-shaped clips extending from the top of the panel, such that the clips attach to one or more of the food separating device crossover bars to hold the advertising panel in position. The system also includes a second advertisement display comprising a removable advertising panel, an advertising panel support bracket, and a pair of bracket clips. The bracket clips attach to the food separating device separator bars to support the second advertisement display above the food separating device. The advertisement display system provides a convenient solution for providing information to consumers related to the items contained on the roller grill, while preventing the controls from being inadvertently accessed.

The present invention substantially diverges in design elements from the prior art and consequently it is clear that there is a need in the art for an improvement to existing roller grill assembly advertisement display systems. In this regard the instant invention substantially fulfills these needs.

Objects of the Invention

In view of the foregoing disadvantages inherent in the known types of roller grill assembly advertisement display systems now present in the prior art, the present invention provides a new roller grill assembly advertisement display system, wherein the same can be utilized for providing consumers with information related to the food product contained on the roller grill assembly.

It is therefore an object of the present invention to provide a new and improved roller grill assembly advertisement display system that has all of the advantages of the prior art and none of the disadvantages.

It is another object of the present invention to provide a roller grill assembly advertisement display system that utilizes a first advertisement display that attaches to a food separating device crossover bar to cover the roller grill assembly control panel.

Still another object of the present invention is to provide a roller grill assembly advertisement display system that covers the roller grill assembly control panel to prevent the controls from being inadvertently accessed.

Another object of the present invention is to provide a roller grill assembly advertisement display system that includes a second advertisement display comprising a removable advertising panel, an advertising panel support bracket, and a pair of bracket clips.

Yet another object of the present invention is to provide a roller grill assembly advertisement display system that utilizes bracket clips that attach to the food separating device separator bars to support the second advertisement display above the food separating device.

The roller grill assembly advertisement display system may be readily fabricated from materials that permit relative economy and are commensurate with durability. Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 6:
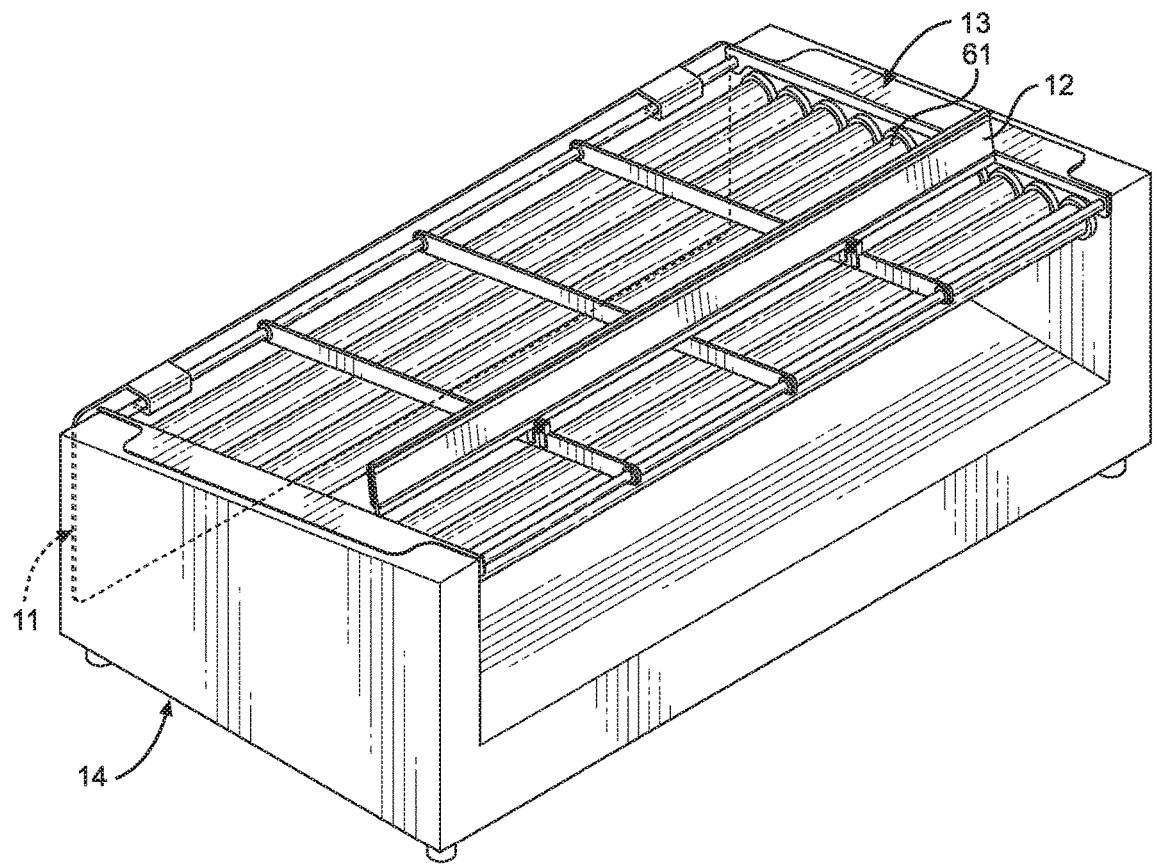

FIG. 6. shows a perspective rear view of the first advertisement display, the second advertisement display, the food separating device, and the roller grill assembly.

Figure 7:
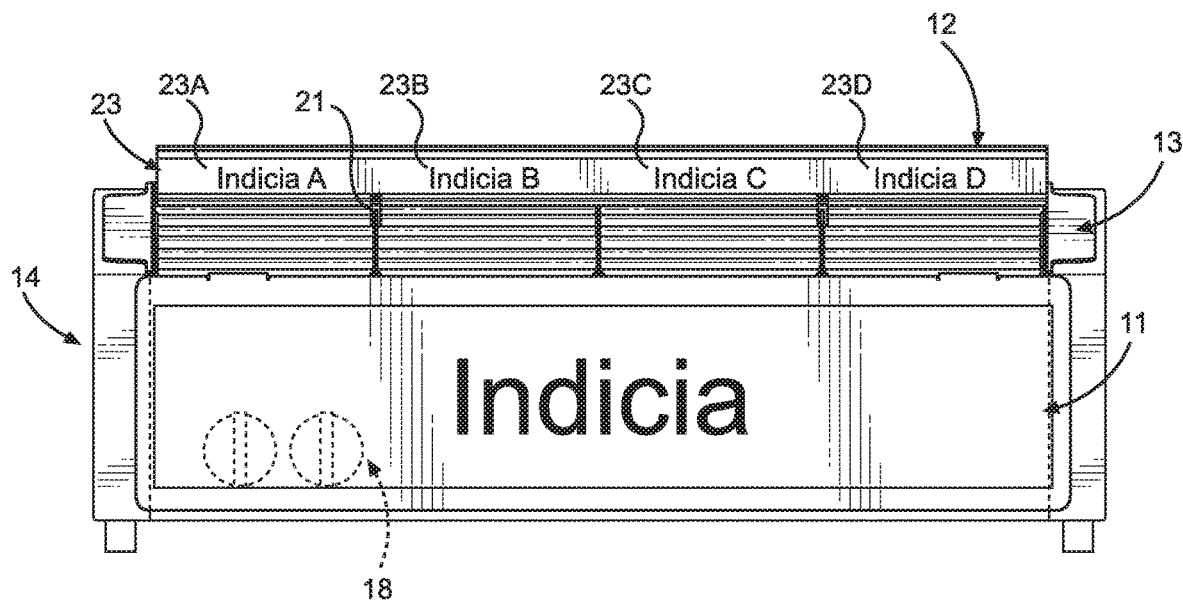

FIG. 7 shows a front view of the first advertisement display, the second advertisement display, the food separating device, and the roller grill assembly.

Figure 8:
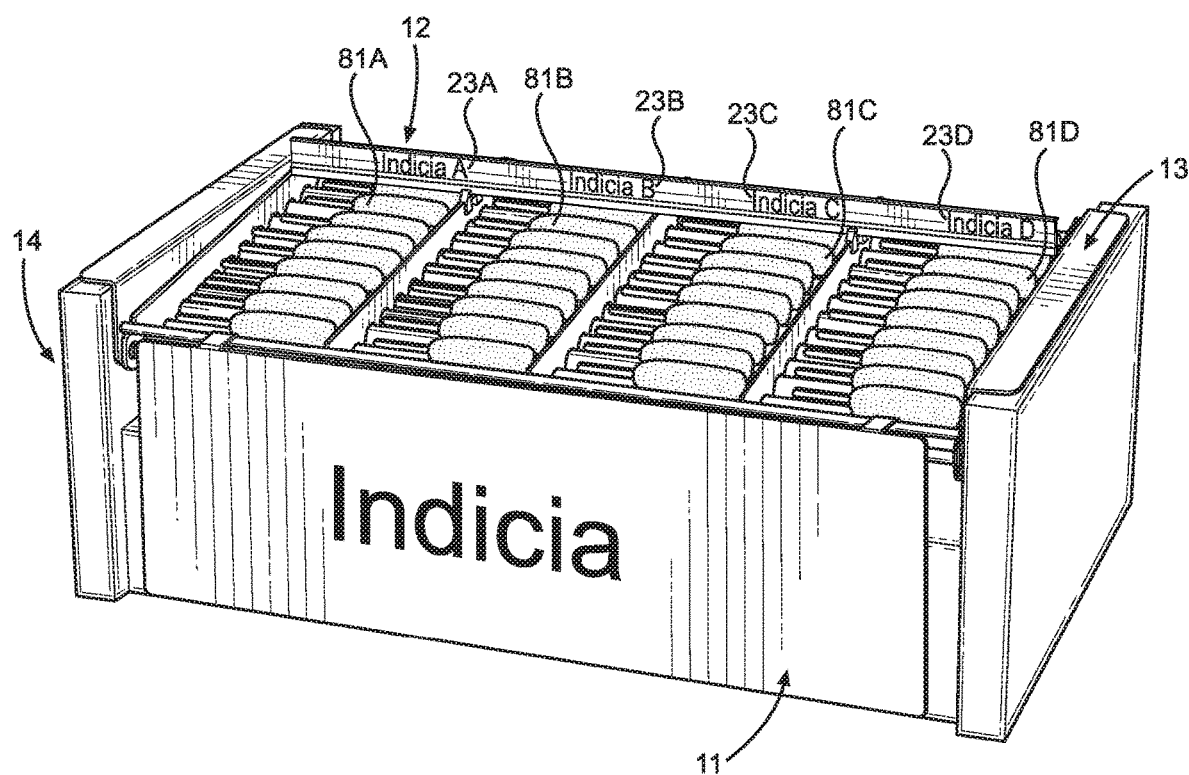

FIG. 8 shows a perspective view of the first advertisement display, the second advertisement display, the food separating device, and the roller grill assembly with food contained thereon.

DETAILED DESCRIPTION OF THE INVENTION

Reference is made herein to the attached drawings. Like reference numerals are used throughout the drawings to depict like or similar elements of the advertisement display system. For the purposes of presenting a brief and clear description of the present invention, the preferred embodiment will be discussed as used for an advertisement display system for a roller grill assembly. The figures are intended for representative purposes only and should not be considered to be limiting in any respect.

Figure 1:
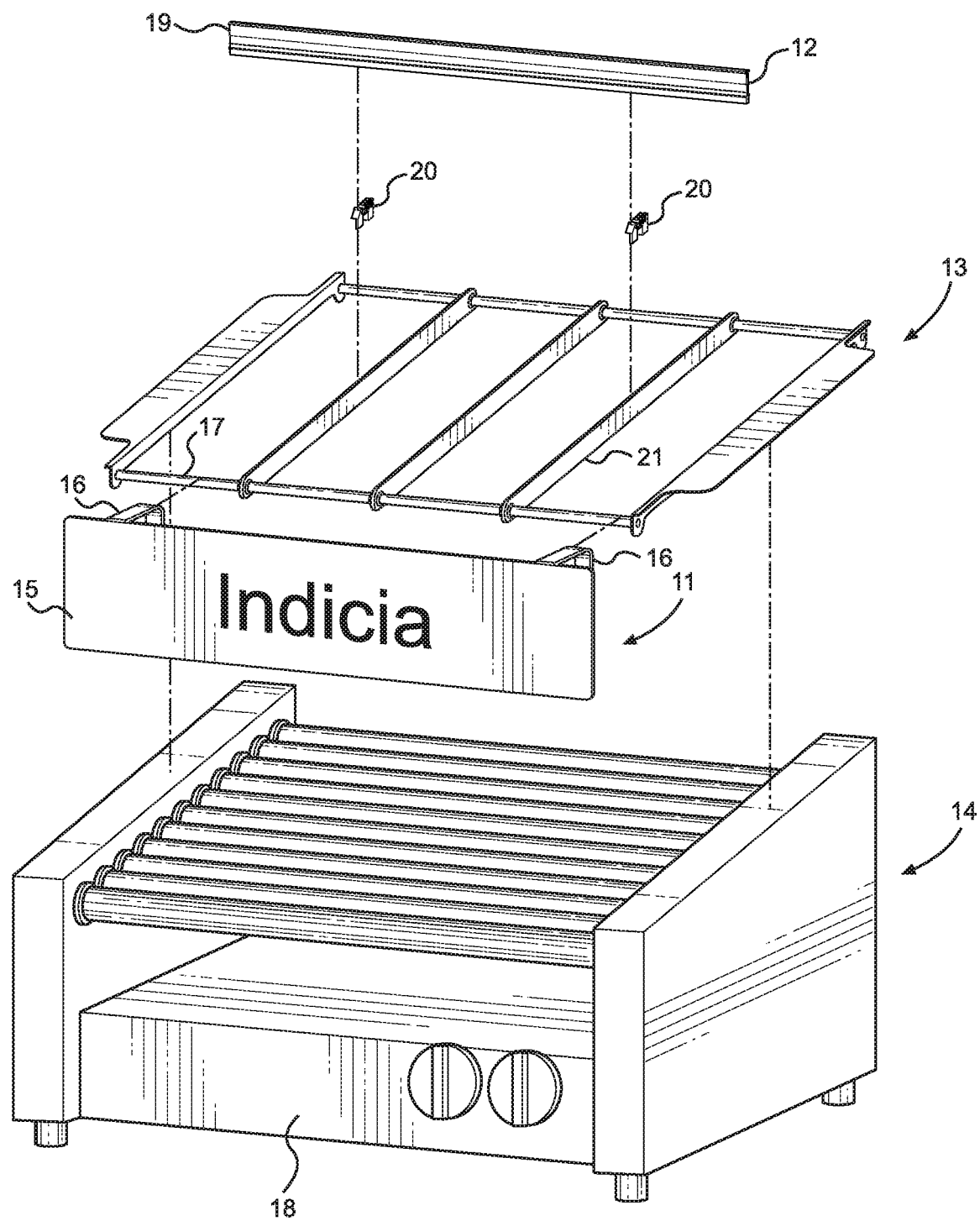
FIG. 1 shows an exploded view of the first advertisement display, the second advertisement display, the food separating device, and the roller grill assembly.

Referring now to FIG. 1, there is shown an exploded view of the first advertisement display 11, the second advertisement display 12, the food separating device 13, and the roller grill assembly 14. The first advertisement display 11 comprises an advertising panel 15 having a top and a bottom, and a pair of J-shaped clips 16 extending at a 90-degree angle from the top of the panel 15, such that the clips 16 attach to the food separating device 13 at the first crossover bar 17 to support the advertising panel 15. When the advertising panel 15 is positioned on the food separating device 13, it substantially covers the control panel 18 of the roller grill assembly 14.

The second advertisement display 12 comprises a removable advertising panel (shown in detail below), an advertising panel support bracket 19, and a pair of bracket clips 20. The bracket clips 20 attach to the food separating device separator bars 21 to support the removable advertising panel and the advertising panel support 19 bracket above the food separating device 13.

Figure 2A:
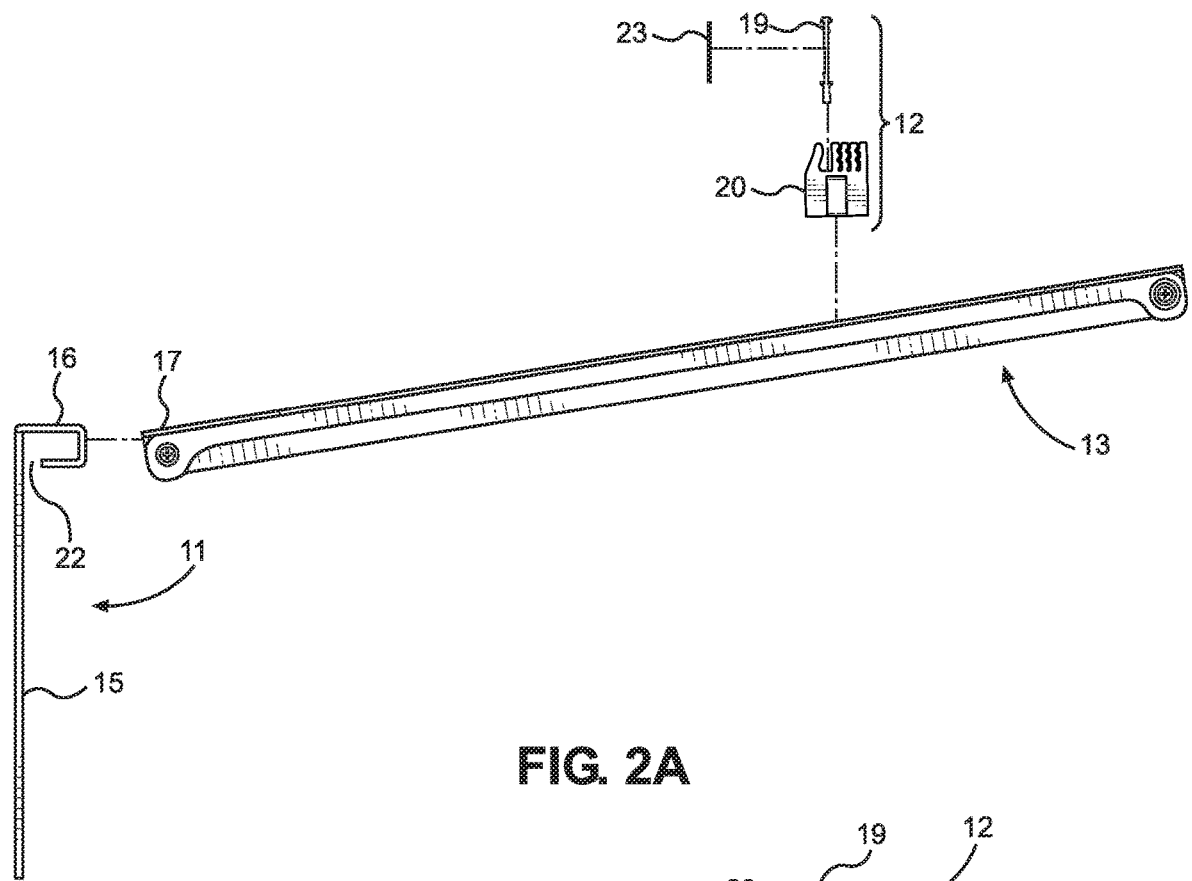
FIG. 2A shows an exploded side view of the first advertisement display, the second advertisement display, and the food separating device.

Referring now to FIG. 2A, there is shown an exploded side view of the first advertisement display 11, the second advertisement display 12, and the food separating device 13. The J-shaped clips 16 are located at the top of the panel 15, and extend therefrom at a 90-degree angle. The clip 16 extends down and back towards the panel 15 to create a J-shaped configuration. A small gap 22 exists between the free end of the clip 16 and the panel 15 to permit the clip 16 to be secured around the first crossover bar 17 of the food separating device 13. As can be appreciated, this configuration permits the advertising panel 15 to be quickly attached and detached as needed.

The second advertisement display 12 utilizes a pair of clips 20 for attachment to the food separating device 13 at the separator bars 21. In the preferred embodiment, the clips 20 comprise a first attachment means for supporting the removable advertising panel 23 and the advertising panel support bracket 19, and a second attachment means for attachment of the clips 20 to the separator bars 21.

Figure 2B:
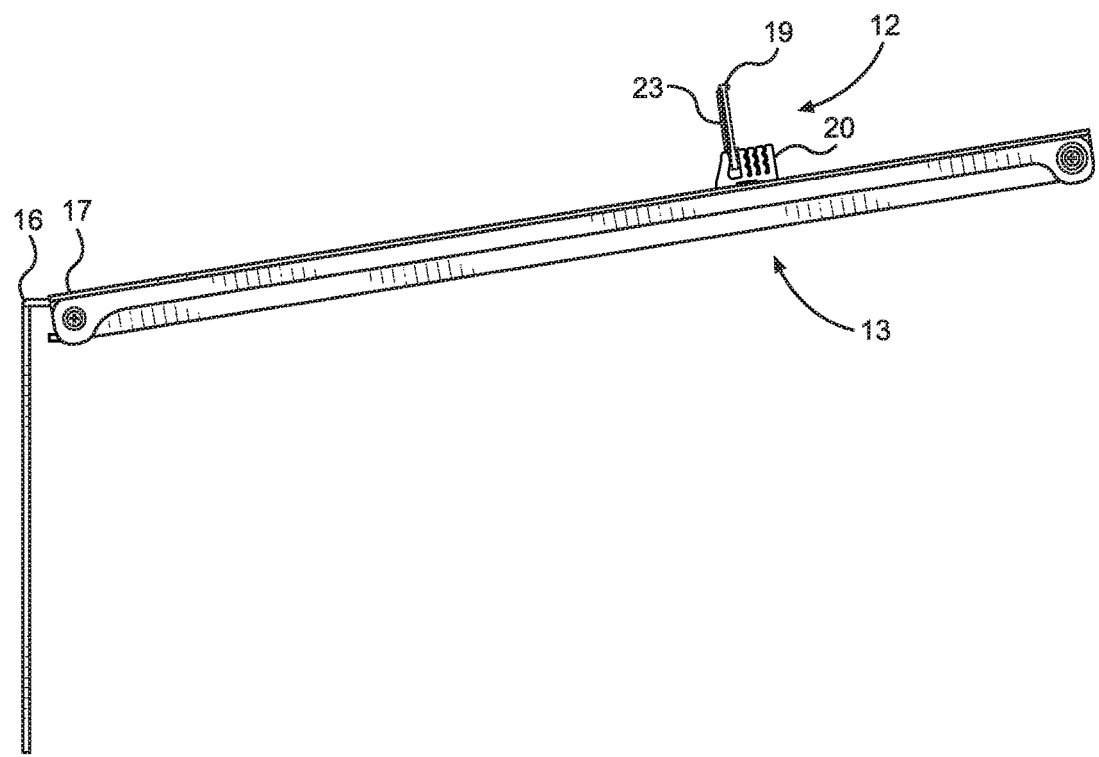
FIG. 2B shows a side view of the first advertisement display, the second advertisement display, and the food separating device.

Referring now to FIG. 2B, there is shown a side view of the first advertisement display 11, the second advertisement display 12, and the food separating device 13. The J-shaped clips 16 secure the first advertisement display 11 to the first crossover bar 17. When attached to the crossover bar 17, the clips 16 function as a hinge that pivots about the crossover bar 17. As will be discussed in greater detail below, the ability of the clips 16 to pivot provides a user with access to the control panel of the roller grill. Additionally, the clips 16 enable the second advertisement display 12 to be secured in position above the surface of the food separating device 13 separator bars 21 for ease of viewing the advertising panel support bracket 19 and the removable advertising panel 23.

Figure 3A:
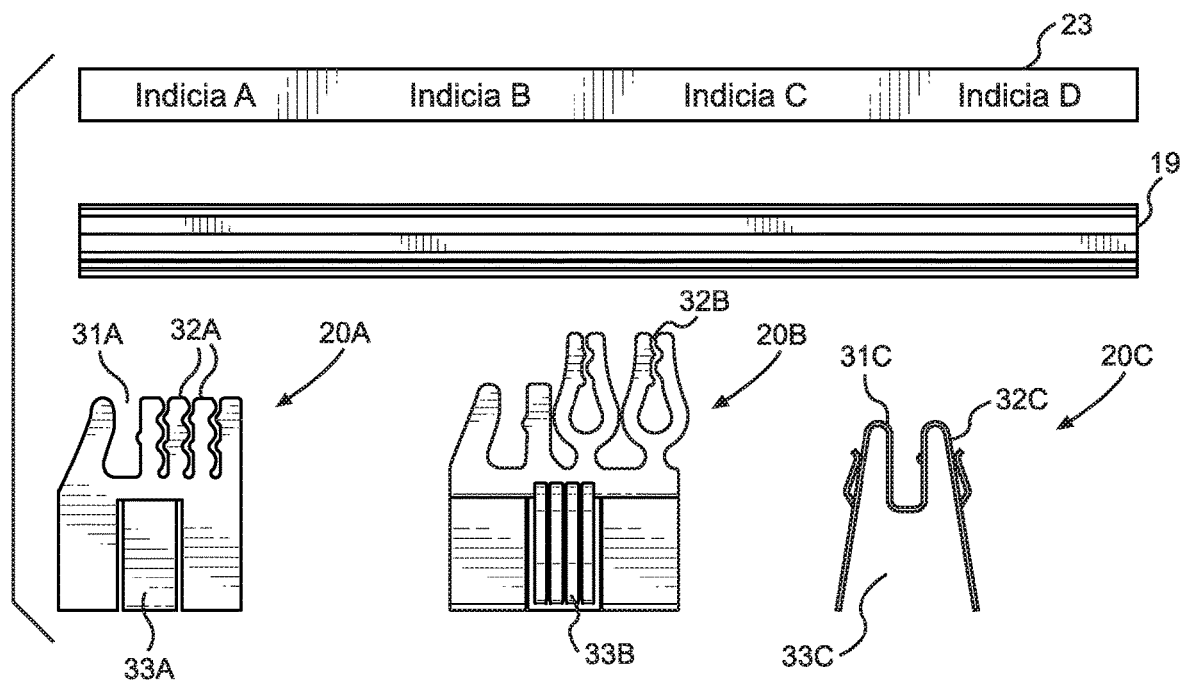
FIG. 3A shows a view of the removable advertising panel, the advertising panel support bracket, and a plurality of bracket clip designs.

Referring now to FIG. 3A, there is shown a view of the removable advertising panel 23, the advertising panel support bracket 19, and a plurality of bracket clip designs 20A-C. The clips 20A-C comprise a first attachment means for supporting the removable advertising panel 23 and the advertising panel support bracket 19, and a second attachment means for attachment to the separator bars. In the first embodiment, the first clip 20A is designed to work with food safe signs and the separator bars 21, as shown in FIG. 1. The first clip 20A further includes a wide banner bar accommodation slot 31A to secure a removable advertising panel 23 and the advertising panel support bracket 19 in position. A plurality of thinner sign accommodation slots 32A are provided for securing one or more product identification signs (not show) on the roller grill. A slot 33A is provided for fastening the clip 20A to the separator bars 21. In the preferred embodiment, the first clip 20A is constructed from a plastic material, preferably an FDA plastic, which causes the device to be cool to the touch.

Similar to the first clip 20A, the second clip 20B comprises a wide banner bar accommodation slot 31B to secure a removable advertising panel 23 and the advertising panel support bracket 19 in position. The second clip 20B further includes a pair of enlarged sign accommodation slots 32B for securing thicker more rigid third party signs and/or thicker third party separator bars (not show) on the roller grill. A slot 33B is provided for fastening the clip 20B to the separator bars 21. In the preferred embodiment, the second clip 20B is constructed from a plastic material, preferably an FDA plastic, which causes the device to be cool to the touch.

The third clip 20C is designed for use in the harshest environments where the other clips are known to fail. The third clip 20C comprises a central banner bar accommodation slot 31C to secure a removable advertising panel 23 and the advertising panel support bracket 19 in position. Either side of the third clip 20C further includes an enlarged sign accommodation slot 32C for securing thicker more rigid third party signs and/or thicker third party separator bars (not show) on the roller grill. In the preferred embodiment, the third clip 20C is constructed from stainless steel.

Figure 3B:
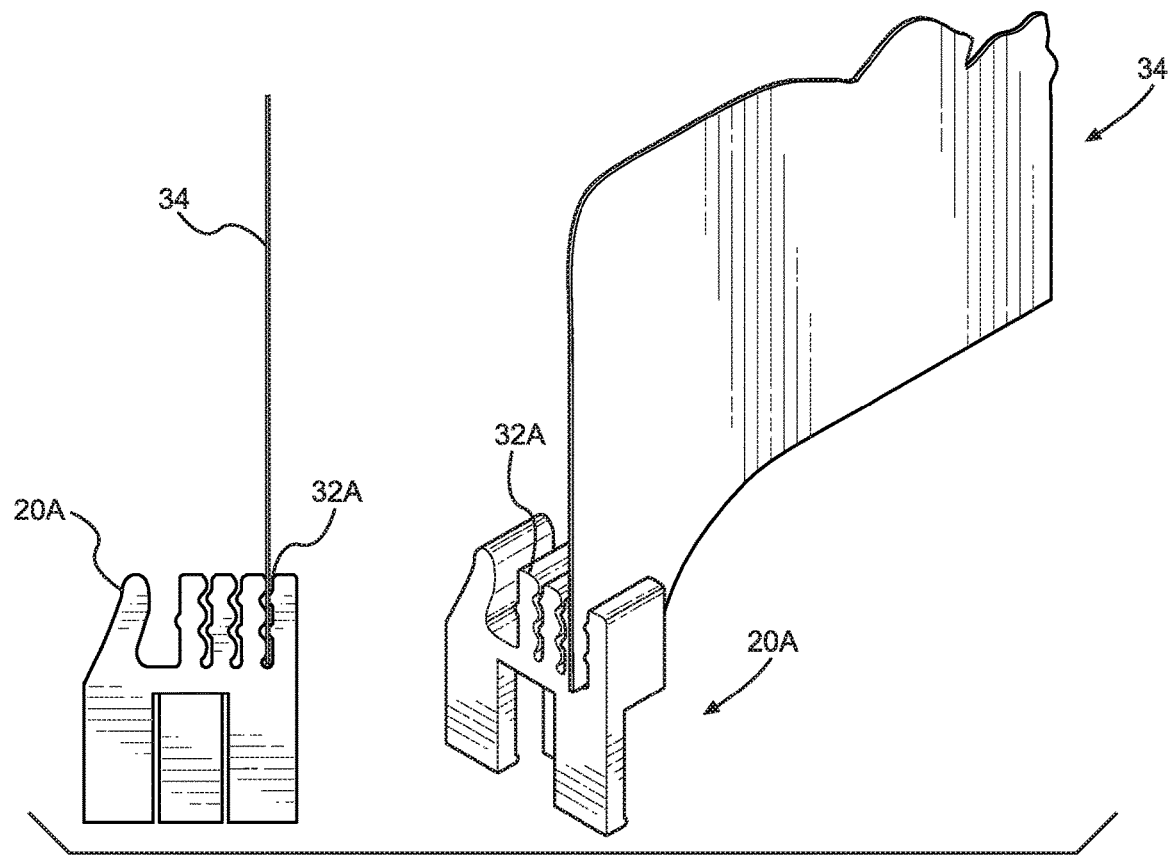
FIG. 3B shows a side view and a perspective view of the first clip supporting a product identification sign.

Referring now to FIG. 3B, there is shown a side view and a perspective view of the first clip 20A supporting a product identification sign 34. In addition to the advertising panel and advertising panel support bracket, the first clip 20A can support one or more product identification sign 34. As can be appreciated, these signs 34 are smaller, thinner, and lighter than the advertising panel and advertising panel support bracket, and require less support. As such, the product identification sign 34 can be readily supported within the thinner sign accommodation slots 32A. As shown, the first clip 20A can comprise one or more slots 32A for supporting one or more product identification signs 34. The end of the sign 34 is held by friction within the slot 32A in order to support the sign in position on a roller grill. As shown in FIG. 3A, the first clip 20A can support an advertising panel and advertising panel support bracket alone, a product identification sign 34 alone, or a combination of advertising panels/support brackets and product identification signs 34.

Figure 4:
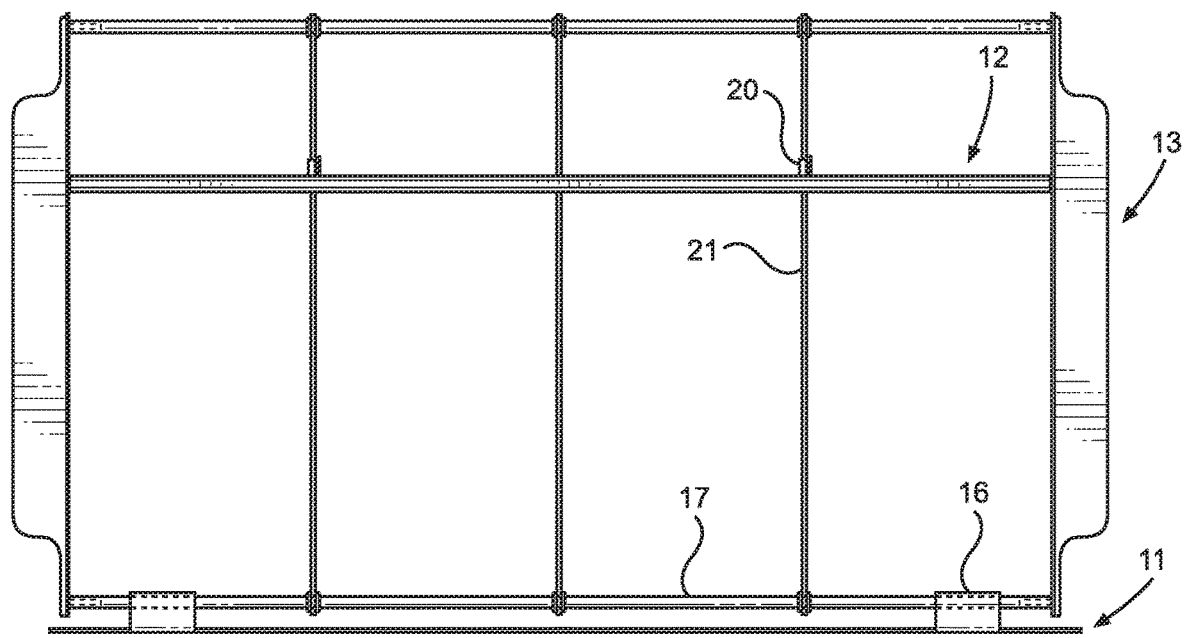
FIG. 4 shows an overhead view of the first advertisement display, the second advertisement display, and the food separating device.

Referring now to FIG. 4, there is shown an overhead view of the first advertisement display 11, the second advertisement display 12, and the food separating device 13. Here, the attachment means for securing the first advertisement display 11 to the food separating device 13 is clearly illustrated. The clips 16 attach the first advertisement display 11 to the food separating device 13 at the first crossover bar 17. A gap exists between the first advertisement display 11 and the food separating device 13 to permit the display 11 to be rotated around the first crossover bar 17. As can be appreciated, the rotation enables the display 11 to be flipped up in order to provide access to the control panel 18 of the roller grill 14, as shown in FIG. 1. The display 11 provides multiple benefits to the user. First, it provides a simple means of advertising the contents of the roller grill. Second, it prevents consumers from accessing the control panel and changing the cooking settings. Finally, it provides for access to the control panel without requiring the display 11 to be completely removed from the food separating device 13.

The second advertisement display 12 attaches to the food separating device 13 separator bars 21 to support the second display 12 above the food separating device 13. One or more clips 20 as as described above can be used to hold the advertisement display 12 in position. As can be seen, the clips 20 can secure the second display 12 to the separator bars 21 at any position along the length of the bars 21. Alternatively, more than one display 12 can be attached to the separator bars 21. As can be appreciated, using more than one display enables a user to advertise different food products at the same time on one roller grill.

Figure 5:
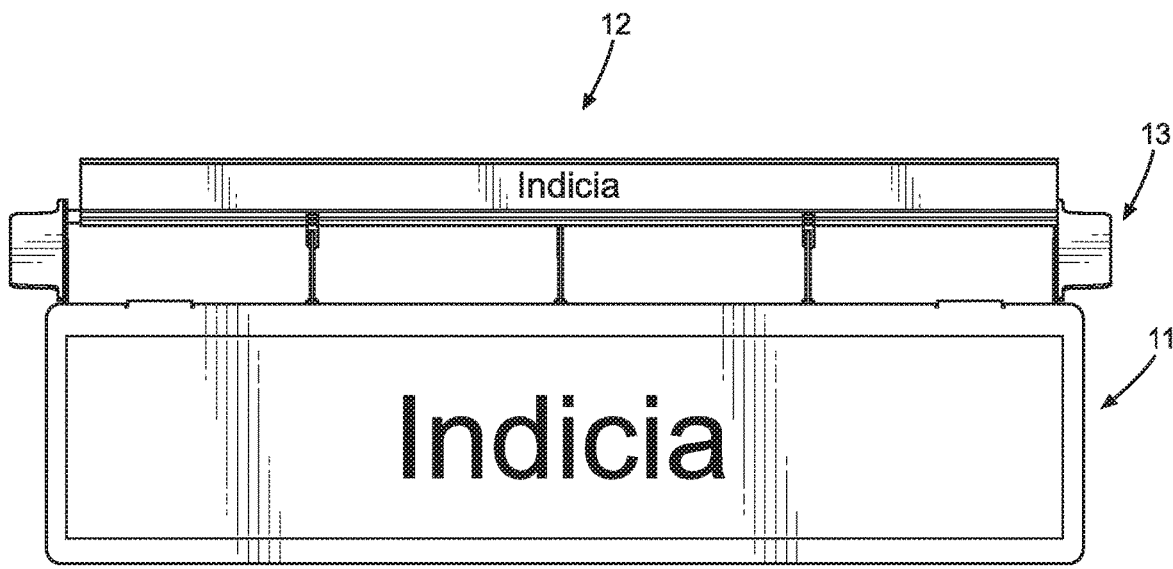
FIG. 5 shows a front view of the first advertisement display, the second advertisement display, and the food separating device.

Referring now to FIG. 5, there is shown a front view of the first advertisement display 11, the second advertisement display 12, and the food separating device 13. The first and second displays 11, 12 provide multiple avenues for advertising the items contained on the food separating device. As a non-limiting example, the first display 11 can be used to advertise a store brand, a food product company brand, or the like, while the second display 12 can be used to advertise a specific food product, a food product price, or the like. Since both displays 11, 12 are attached to the food separating device 13, they can be easily lifted and removed from the roller grill as needed. As can be appreciated, a conventional food separating device 13 that is known and used in the art rests on the top of a roller grill and can be readily installed and removed as desired. Removal of the food separating device 13 will in turn remove the displays 11, 12, which provides access to the roller grill when these components are not needed.

Referring now to FIG. 6, there is shown a perspective rear view of the first advertisement display 11, the second advertisement display 12, the food separating device 13, and the roller grill assembly 14. The first and second advertisement displays 11, 12 can be utilized with a conventional roller grill 14 that is known in the art. The first display 11 covers over the front of the grill 14, while the second display 12 can be positioned near the rollers 61. Positioning the second display 12 near the rollers 61 provides a simple and cost effective means for advertising the food products contained on the grill 14. Additionally, the displays 11, 12 are positioned within close proximity to the grill 14 and thereby do not require additional space, which is ideal for use in small spaces, such as on a countertop that contains other items for sale.

Referring now to FIG. 7, there is shown a front view of the first advertisement display 11, the second advertisement display 12, the food separating device 13, and the roller grill assembly 14. When the first advertisement display 11 is positioned on the food separating device 13, it substantially covers the control panel 18 of the roller grill assembly 14. By covering the control panel 18, the device provides the additional benefit of preventing consumers from inadvertently accessing the control panel 18 and changing the cooking settings. As described above, the first advertisement display 11 can be flipped up in order to provide access to the control panel 18 of the roller grill 14.

In a preferred embodiment, the removable advertising panel 23 can be divided into sections 23A-D that correspond to the spaces between the separator bars 21. In this configuration, each section of the panel sections 23A-D can be used to identify the contents directly in front thereof. This configuration is particularly useful for food products that appear similar on the exterior while having a different content or flavor, such as mild and spicy sausages. As a non-limiting example, a first section 23A can be utilized to advertise mild sausages, while a second section 23B can be utilized to advertise spicy sausages.

Referring now to FIG. 8, there is shown a perspective view of the first advertisement display 11, the second advertisement display 12, the food separating device 13, and the roller grill assembly 14 with food (in this example, corn dogs) 81A-D contained thereon. In this non-limiting example, each section of the panel sections 23A-D is used to identify the corn dogs 81A-D directly in front thereof. As an example, the corn dogs 81A positioned in front of panel 23A may be cheddar cheese corn dogs, the corn dogs 81B positioned in front of panel 23B may be jalapeno cheese corn dogs, the corn dogs 81C positioned in front of panel 23C may be beef corn dogs, and the corn dogs 81D positioned in front of panel 23D may be classic corn dogs. As can be appreciated, distinguishing between corn dog types visually can be difficult, if not impossible, and consumers may handle the food items in order to determine the exact flavor thereof. If they choose incorrectly, they may put the food back on the grill 14 after handling it, or may request a refund after purchasing it. With the use of the display panels 11, 12, this determination can be readily made without the need for inspection of the food product.

Overall, the present invention provides a convenient solution for an advertisement display system that works in conjunction with a roller grill assembly and a food separating device. The display system enables a user to quickly determine the brand of food contained on the roller grill, the flavor of the food, and the price thereof. The device also limits access to the control panel to prevent inadvertent changes to the cooking settings. The signs can be easily attached and removed as desired to advertise different food products throughout the day (such as different foods for breakfast, lunch, and dinner) or to advertise a special price for a limited time.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An advertisement display system for a roller grill assembly, said roller grill assembly having a control panel, said advertisement display system comprising:
a food separating device comprising a pair of support brackets for supporting said food separating device on said roller grill, a first and a second crossover bar, and a plurality of separator bars that extend perpendicular to said rollers;
a first advertisement display comprising an advertising panel having a top and a bottom, wherein said first advertisement display and said advertising panel attach to said first crossover bar to support said advertising panel, wherein said advertising panel substantially covers said control panel of said roller grill assembly;
a second advertisement display comprising a removable advertising panel, an advertising panel support bracket, and a pair of bracket clips, wherein said bracket clips attach to said separator bars to support said removable advertising panel and said advertising panel support bracket above said food separating device.

2. The device of claim 1, wherein said bracket clip comprises a first slot to secure a first advertising panel and advertising panel support bracket, a second slot for securing a second advertising panel and advertising panel support bracket, and a third slot for fastening said clip to said separator bars.

3. The device of claim 1, wherein said first advertisement display further comprises a pair of J-shaped clips extending at a 90-degree angle from said top of said panel, wherein said clips attach to said first crossover bar to support said advertising panel, and wherein said J-shaped clips rotate around said first crossover bar to flip said first advertisement display up in order to provide access to said control panel of said roller grill assembly.

4. The device of claim 1, wherein said clips attach to said separator bars at any position along the length of said separator bars.

5. The device of claim 1, wherein said removable advertising panel is divided into one or more sections that align with spaces between said separator bars on said roller grill rollers.

6. An advertisement display system for a roller grill assembly, said roller grill assembly having a control panel, said advertisement display system comprising:
a food separating device comprising a pair of support brackets for supporting said food separating device on said roller grill, a first and a second crossover bar, and a plurality of separator bars that extend perpendicular to said rollers;

a first advertisement display comprising an advertising panel having a top and a bottom, and a pair of J-shaped clips extending at a 90-degree angle from said top of said panel, wherein said clips attach to said first crossover bar to support said advertising panel, wherein said advertising panel substantially covers said control panel of said roller grill assembly;

a second advertisement display comprising a removable advertising panel, an advertising panel support bracket, and a pair of bracket clips, wherein said bracket clips attach to said separator bars to support said removable advertising panel and said advertising panel support bracket above said food separating device, wherein said bracket clips comprise a first slot to secure a first advertising panel and advertising panel support bracket, a second slot for securing a second advertising panel and advertising panel support bracket, and a third slot for fastening said clip to said separator bars.

7. The device of claim 6, wherein said J-shaped clips rotate around said first crossover bar to flip said first advertisement display up in order to provide access to said control panel of said roller grill assembly.

8. The device of claim 6, wherein said clips attach to said separator bars at any position along the length of said separator bars.

9. The device of claim 6, wherein said removable advertising panel is divided into one or more sections that align with spaces between said separator bars on said roller grill rollers.

10. An advertisement display system for a roller grill assembly, said roller grill assembly having a control panel, said advertisement display system comprising:

a food separating device comprising a pair of support brackets for supporting said food separating device on said roller grill, a first and a second crossover bar, and a plurality of separator bars that extend perpendicular to said rollers;

a first advertisement display comprising an advertising panel having a top and a bottom, and a pair of J-shaped clips extending at a 90-degree angle from said top of said panel, wherein said clips attach to said first crossover bar to support said advertising panel, wherein said advertising panel substantially covers said control panel of said roller grill assembly, wherein said J-shaped clips rotate around said first crossover bar to flip said first advertisement display up in order to provide access to said control panel of said roller grill assembly;

a second advertisement display comprising a removable advertising panel, an advertising panel support bracket, and a pair of bracket clips, wherein said removable advertising panel is divided into one or more sections that align with spaces between said separator bars on said roller grill rollers; wherein said bracket clips attach to said separator bars to support said removable advertising panel and said advertising panel support bracket above said food separating device, wherein said bracket clips comprise a first slot to secure a first advertising panel and advertising panel support bracket, a second slot for securing a second advertising panel and advertising panel support bracket, and a third slot for fastening said clip to said separator bars.

* * * * *